(12) United States Patent
Mandal et al.

(10) Patent No.: US 11,383,227 B2
(45) Date of Patent: Jul. 12, 2022

(54) HYDROTHERMALLY STABLE CATALYST COMPOSITION AND A PROCESS FOR PREPARATION THEREOF

(71) Applicant: Reliance Industries Limited, Mumbai (IN)

(72) Inventors: Sukumar Mandal, Faridabad (IN); Sateesh Daggupati, Khamman (IN); Sachchit Kumar Majhi, Jamshedpur (IN); Asit Kumar Das, Faridabad (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 598 days.

(21) Appl. No.: 16/331,872

(22) PCT Filed: Sep. 6, 2017

(86) PCT No.: PCT/IB2017/055367
§ 371 (c)(1),
(2) Date: Mar. 8, 2019

(87) PCT Pub. No.: WO2018/047076
PCT Pub. Date: Mar. 15, 2018

(65) Prior Publication Data
US 2021/0283585 A1    Sep. 16, 2021

(30) Foreign Application Priority Data
Sep. 8, 2016 (IN) .............................. 201621030720

(51) Int. Cl.
| | | |
|---|---|---|
| *B01J 27/232* | (2006.01) | |
| *B01J 35/10* | (2006.01) | |
| *B01J 37/00* | (2006.01) | |
| *B01J 37/02* | (2006.01) | |
| *B01J 37/10* | (2006.01) | |
| *B01J 21/12* | (2006.01) | |

(52) U.S. Cl.
CPC ......... *B01J 27/232* (2013.01); *B01J 35/1014* (2013.01); *B01J 35/1019* (2013.01); *B01J 35/1038* (2013.01); *B01J 35/1042* (2013.01); *B01J 35/1061* (2013.01); *B01J 37/0045* (2013.01); *B01J 37/0207* (2013.01); *B01J 37/10* (2013.01); *B01J 21/12* (2013.01)

(58) Field of Classification Search
CPC .. B01J 27/232; B01J 35/1014; B01J 35/1019; B01J 35/1038; B01J 35/1042; B01J 35/1061; B01J 37/0045; B01J 37/0207; B01J 37/10; B01J 21/12
See application file for complete search history.

(56) References Cited

U.S. PATENT DOCUMENTS

| | | | |
|---|---|---|---|
| 4,475,925 A | 10/1984 | Hsieh | |
| 2007/0083072 A1 | 4/2007 | Nahas | |
| 2009/0165380 A1 | 7/2009 | Lau et al. | |
| 2010/0181539 A1 | 7/2010 | Apanel et al. | |
| 2011/0152596 A1* | 6/2011 | Zanthoff .................. C07C 1/20 585/640 |

FOREIGN PATENT DOCUMENTS

| | | | |
|---|---|---|---|
| CN | 104437451 A * | 3/2015 | ............. C10J 3/466 |
| EP | 0024792 A2 | 3/1981 | |
| WO | 2003011437 A1 | 2/2003 | |
| WO | 2014122668 A1 | 8/2014 | |
| WO | WO-2014122668 A1 * | 8/2014 | ............ B01J 29/084 |

OTHER PUBLICATIONS

Foreign Reference Translation (Enspacenet) (Year: 2021).*
International Search Report issued in International Application No. PCT/IB2017/055367 dated Dec. 22, 2017 (3 pages).
Written Opinion issued in International Application No. PCT/IB2017/055367 dated Dec. 22, 2017 (5 pages).
Kikuchi, E. et al. "Gasification of Active Carbon With Alumina-Supported Potassium Carbonate Catalyst" Department of Applied Chemistry, 179-185 (7 pages).

* cited by examiner

*Primary Examiner* — Anthony J Zimmer
*Assistant Examiner* — Logan Edward Laclair
(74) *Attorney, Agent, or Firm* — Osha Bergman Watanabe & Burton LLP

(57) ABSTRACT

The present disclosure relates to a hydrothermally stable catalyst composition. The hydrothermally stable supported catalyst composition comprises $K_2CO_3$ impregnated on an amorphous silica-alumina support. The weight ratio of silica to alumina in the support is in the range of 0.1 to 1.5. The amount of $K_2CO_3$ is in the range of 5 wt % to 60 wt % with respect to the total catalyst composition. The catalyst composition is characterized by a pore volume in the range of 0.1 cc/g to 0.9 cc/g, a surface area in the range of 40 $m^2/g$ to 250 $m^2/g$ and an attrition index in the range of 2% to 8%. The present disclosure also relates to a process for preparing the catalyst composition. The catalyst composition provides improved hydrothermal stability, attrition resistance, high pore volume and surface area for gasifying carbonaceous feed at low temperature, as compared to a conventional catalyst composition.

11 Claims, No Drawings

HYDROTHERMALLY STABLE CATALYST COMPOSITION AND A PROCESS FOR PREPARATION THEREOF

FIELD

The present disclosure relates to the field of catalysts. Particularly, the present disclosure relates to a hydrothermally stable catalyst composition and a process for preparing the same.

Definitions

As used in the present disclosure, the following words and phrases are generally intended to have the meaning as set forth below, except to the extent that the context in which they are used to indicate otherwise.

Synthesis gas: The term "synthesis gas" is also known as syngas and refers to a fuel gas mixture consisting primarily of hydrogen, carbon monoxide, and very often carbon dioxide.

Gasification: The term "gasification" refers to a process that converts organic or fossil fuel based carbonaceous materials into carbon monoxide, hydrogen and carbon dioxide. This is achieved by reacting the materials (in dry form or slurry made with water) at high temperatures (>700° C.), by partial oxidation, with a controlled amount of oxygen and/or steam (in case of dry feed).

Low temperature gasification refers to gasification of carbonaceous feedstock carried out at a temperature in the range of 600° C. to 850° C.

BACKGROUND

Gasification is a process that converts carbonaceous materials into synthesis gas comprising carbon monoxide, hydrogen and carbon dioxide. Gasification is an efficient carbon conversion technology as compared to that of combustion. However, its commercial installations have not been widely adopted around the world because of its high CAPEX/OPEX (capital expenditure/operational expenditure) and reliability issues.

Most of the commercial entrained flow gasifiers use pure oxygen and they operate under conditions which are severe, such as above ash fusion temperatures (>1400° C.) and at pressures of greater than 25 bar. These gasifiers frequently encounter severe reliability issues such as slag flowability/handling, refractory life, tar formation and other cost intensive maintenance issues with air separation units and other downstream units.

Commercial fluidized bed gasifiers operate between the ash softening and melting point temperatures. Therefore, these gasifiers encounter several issues such as low carbon conversion, agglomeration, caking, de-fluidization, hot-spots, uncontrolled oxy-combustion, and low calorific value of the product gas due to nitrogen dilution, and the like. Furthermore, it is difficult to gasify low reactive feedstocks, such as, petroleum coke (petcoke) because of its lower gasification kinetics, which demands even higher operating temperature than that of lignite, biomass and subbituminous coal which are known to be highly reactive. Hence, the gasification of petcoke coal necessitates catalytic action for its gasification, which has the ability to provide complete carbon conversion at low temperatures and thus avoid extreme operating conditions.

The following are few prior arts in which catalyst and its composition is disclosed for gasification of carbonaceous feedstocks:

US2010/0181539 demonstrated a novel configuration for dual fluidized bed gasification scheme. It consists of a primary dual fluidized bed loop, which produces the synthesis gas with inferior quality containing excess levels of higher hydrocarbons, tars and methane etc. and it is further treated in a gasifier of secondary dual fluidized bed loop for producing high quality synthesis gas in presence of nickel supported by α-alumina. The catalyst circulated between the combustor and gasifier in both primary and secondary dual fluidized bed loops for transferring heat from combustor and gasifier. Though it teaches the use of attrition resistant supported catalyst for fine tuning and achieve the molar ratio of syngas to suit feedstock for Fischers-Tropsch synthesis process, the support i.e. α-alumina has very low surface area, pore volume and accessibility which does not provide adequate surface area for active metal dispersion. In addition, proposed catalyst i.e. Ni is not a suitable active metal site for the steam gasification of the carbonaceous feedstocks.

U.S. Pat. No. 4,475,925 teaches a suitable set of catalyst and heat carrier material for the gasification of carbonaceous solids by using a dual fluidized bed gasification system. A mixture of petcoke and KNOB (either by physical mixing or impregnation) and sintered bauxite are suitable for the agglomeration free gasification up to 950° C. The upper limit of the reaction temperature for a given catalyst-heat carrier mixture has been found for avoiding agglomeration/sintering with heat carrier. As the catalyst is physically mixed with the feed instead of impregnated on support, the catalyst loss and regeneration are the primary issues which are not discussed.

US2007/0083072 discloses a process in which alkali catalyst was impregnated on petcoke (~5 times greater than the ash content of the feedstock) and gasified at a temperature 650-760° C. and pressure about 34 bars. A part of product syngas was recycled back to the gasifier and these conditions favors the SNG production directly. It demonstrates the method in which endothermic heat demand for steam gasification is managed with the exothermic heat of methanation. The regeneration of the entire catalyst is impossible since the catalyst is impregnated on the carbon feedstock itself. Therefore, it necessitates costly recovery of catalyst for reuse.

EU0024792 teaches the use of $K_2CO_3$ or $Na_2CO_3$ catalyst for the gasification of carbonaceous feedstocks. The alkali catalyst (5 to 50 wt. %) is impregnated on coal and gasified in presence of steam and 02 at a temperature in the range of 650 to 790° C. and pressure in the range of 3 to 14 $kg/cm^2$. The major drawback of this process is that the critical issues such as catalyst loss, recovery and regeneration are not addressed. The proposed process is not economically feasible as the catalyst is impregnated on the feed, which demands expensive and elaborative processing steps for recovery and reuse.

US2009/0165380 reveals the composition for catalytic gasification of petcoke in which a catalyst (mixture of KOH and $K_2CO_3$) is loaded on coke for gasification at 700° C., 34 atm. in a fluidized bed gasifier along with recycled syngas stream. This patent discloses the best operating conditions and catalyst composition for the direct conversion of carbonaceous feedstock into methane. In order to meet the endothermic heat demand, it is proposed to combine the methanation reaction with the steam gasification and the overall reaction is expected to be heat neutral. However, due to the process heat losses and other energy requirements (such as evaporation of moisture in the feed stock) a small amount oxygen rich gas stream proposed to injected to the reactor for maintaining the thermal balance. Though it teaches the efficient ways of achieving heat balance, as the catalyst (preferably alkali) is impregnated on carbonaceous feedstock, the catalyst recovery and regeneration demand additional complex process configurations which are capital intensive processes.

Kikuchi et. al., 1984 (ACS Fuel Volumes, 29 (2), 179-185) teaches the use of supported catalyst i.e. 17 wt. % of $K_2CO_3$ impregnated on $\alpha$-$Al_2O_3$ for the gasification of active carbon in a single fluidized bed gasifier at 850° C. and studied the kinetics of activated carbon and effect of catalyst loadings on gasification rate etc. It is known that the $\alpha$-alumina has low pore volume and surface area which is not sufficient for better dispersion of alkali on the $\alpha$-alumina. It was also concluded that the effect of catalyst to the coke ratio on carbon conversion is negligible within the experimental conditions. It may be noted that the kinetics at high temperature is different than that of at low temperature. The effect catalytic action on the gasification yield is significant at lower temperature than the higher temperatures. A high pore volume catalyst is essential for higher metal loading for achieving substantial catalytic gasification at the lower temperatures (i.e. <750° C.).

Conventional catalysts for gasification are prepared either by impregnating the catalyst directly on carbonaceous feedstock or by physically mixing the catalyst with carbonaceous feedstock, or by impregnating the catalyst on a conventional support, followed by physically mixing the catalyst with the carbonaceous feedstock. However, in the first two cases, as the reaction proceeds, the catalyst can escape from the gasifier along with the fly ash, which leads to expensive processing steps for recovery and reuse of the catalyst.

In the third case, the pore volume, surface area, hydrothermal stability and attrition resistance of the support are important factors when supported catalysts are used for gasification, for attaining sustainable and superior gasification activity during the conversion of carbonaceous feedstocks at significantly lower temperatures, and for overcoming the difficulties in catalyst recovery, regeneration and its reuse. Also, in the third case, where a catalyst includes a conventional support, the catalyst does not possess the desired hydrothermal stability, attrition resistance, higher metal loadings and superior and continuous gasification activity.

Therefore, there is felt a need for a catalyst composition for the gasification process which can provide sustainable gasification with greater reliability.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a catalyst composition which is hydrothermally stable to carry out the gasification of carbonaceous feedstock at lower temperature.

Another object of the present disclosure is to provide a catalyst composition that retains the pore volume, surface area and attrition resistance (mechanical strength) after the gasification of carbonaceous feedstock.

Still another object of the present disclosure is to enable higher loadings of active metals on a support of a catalyst composition.

Yet another object of the present disclosure is to provide a catalyst composition for producing high quality synthesis gas ($H_2$/CO).

Other objects and advantages of the present disclosure will be more apparent from the following description, which is not intended to limit the scope of the present disclosure.

SUMMARY

The present disclosure provides a hydrothermally stable catalyst composition for low temperature gasification of carbonaceous feedstock. The carbonaceous feedstock can be selected from the group consisting of petcoke, coal, biomass, wood and other carbon-containing materials and mixtures thereof. The catalyst composition comprises an amorphous silica-alumina support; and $K_2CO_3$ impregnated on the support.

A weight ratio of silica to alumina in the amorphous silica-alumina support can be in the range of 0.1 to 1.5.

Typically, the weight ratio of silica to alumina in the amorphous silica-alumina support can be in the range of 0.1 to 0.9.

The amount of $K_2CO_3$ impregnated on the amorphous silica-alumina support can be in the range of 5 wt % to 60 wt % with respect to the total catalyst composition.

The catalyst composition can be characterized by a pore volume in the range of 0.1 cc/g to 0.9 cc/g, a surface area in the range of 40 $m^2$/g to 250 $m^2$/g and an attrition index in the range of 2% to 8%.

The catalyst composition is hydrothermally stable even up to a temperature of 850° C.

The pore volume, the surface area and the attrition index of the catalyst composition is retained after gasifying the carbonaceous feedstock in the presence of the catalyst composition.

The present disclosure also provides a process for preparing the hydrothermally stable catalyst composition. The process comprises mixing a silica salt in water to obtain an alkaline aqueous solution. An acidic aqueous solution is added to the alkaline aqueous solution while maintaining the pH in the range of 8 to 9, to obtain precipitated silica. The precipitated silica is separated to obtain silica cake. The silica cake is treated with an acidic aqueous solution of an aluminum salt to obtain a first slurry. The first slurry is stirred to obtain a hydrated silica alumina slurry having a pH less than 2. An aqueous solution of sodium aluminate or calcium aluminate is added to the hydrated silica alumina slurry to obtain a second slurry having a pH in the range of 4 to 5. The second slurry is filtered to obtain a wet cake. The wet cake is re-slurried in water to obtain a pumpable slurry, followed by spray drying the pumpable slurry to obtain an amorphous silica-alumina support having an average particle size in the range of 80 μm to 150 μm. The amorphous silica-alumina support is impregnated with $K_2CO_3$ to obtain a $K_2CO_3$ impregnated support, followed by drying the $K_2CO_3$ impregnated support to obtain a hydrothermally stable catalyst composition.

The silica salt can be at least one of sodium silicate and potassium silicate.

The acidic aqueous solution comprises 30% to 40% of an acid in water.

The acid can be least one selected from the group consisting of sulfuric acid, hydrochloric acid and nitric acid.

The aluminum salt can be at least one of aluminum sulfate and aluminum chloride.

The acidic aqueous solution of the aluminum salt can be obtained by mixing the aluminum salt in 30% to 40% of an acid.

The process step of $K_2CO_3$ impregnation is carried out by either an incipient wetness impregnation method or a multi-step impregnation method.

DETAILED DESCRIPTION

The hydrothermal stability of a catalyst is a critical parameter for catalytic gasification of carbonaceous feedstocks to synthesis gas, as the catalyst is expected to endure the severe hydrothermal environment (for example:—of steam and hydrogen) during the gasification of carbonaceous feedstocks. It is observed that the hydrothermal stability of the conventional support, i.e., γ-alumina is inferior under the conditions of catalytic gasification and hence, it is unable to provide stable gasification activity, which leads to reduction in carbon conversion during the steam gasification of carbonaceous feedstocks over a period of time.

Typically, the pore volume and surface area of the commercially available spray dried micro sphere γ-alumina particles are <0.5 cc/g and <185 $m^2/g$, respectively. It is observed that there is a significant loss in the pore volume and the surface area of the γ-alumina when it undergoes the hydrothermal deactivation test (particularly in the presence of steam at 800° C. and for 24 hours). The pore volume and the surface area of the γ-alumina drops to <0.28 cc/g and <65 $m^2/g$, respectively, due to the hydrothermal deactivation. It is observed that if higher amount of active metals is loaded on to the support, a further reduction in the pore volume and surface area is obtained. Also, active metals are buried in the pores of the support and may not be accessible for the reaction.

Further, it is observed that the alkali metals supported γ-alumina catalyst, when used in the gasification of carbonaceous feedstocks at high temperature in the presence of steam and hydrogen, is prone to loss of pore volume due to the phase transition of γ-alumina to a more stable α-alumina, resulting in loss of the gasification activity over a period of time. Moreover, there are several commercial supports available are not able to retain the attrition index. Further, is it observed that the alkali metals form agglomerates (alkali-alumino-silicates) with the silica-alumina matrix which is not desired.

The present disclosure therefore envisages a hydrothermally stable catalyst composition and a process for preparing the same that obviates the above mentioned drawbacks.

In an aspect of the present disclosure, the hydrothermally stable catalyst composition comprises an amorphous silica-alumina support; and $K_2CO_3$ impregnated on the support (the term "support" mentioned hereinafter refers to the "amorphous silica-alumina support").

In accordance with one embodiment of the present disclosure the weight ratio of silica to alumina in the support is in the range of 0.1 to 1.5. In accordance with another embodiment of the present disclosure, the weight ratio of silica to alumina in the support is in the range of 0.1 to 0.9. $K_2CO_3$ is impregnated on the amorphous silica-alumina support in an amount in the range of 5 wt % to 60 wt % with respect to the total catalyst composition.

The catalyst composition is characterized by a pore volume in the range of 0.1 cc/g to 0.9 cc/g, a surface area in the range of 40 $m^2/g$ to 250 $m^2/g$ and an attrition index in the range of 2% to 8%.

Particularly, the amorphous nature of silica in the silica-alumina support facilitates in resisting the phase transition of the alumina, i.e., from gamma alumina to alpha alumina.

The use of the amorphous support having a high pore volume and surface area enables higher alkali ($K_2CO_3$) loadings and better alkali dispersion on the support, which in turn provides superior gasification activity.

In another aspect of the present disclosure, there is provided the process for preparing the catalyst composition. The process is described herein below.

A silica salt is mixed in water to obtain an alkaline aqueous solution. The silica salt is at least one of sodium silicate and potassium silicate.

An acidic aqueous solution is added to the alkaline aqueous solution while maintaining the pH in the range of 8 to 9, to obtain precipitated silica. The acidic aqueous solution comprises 30% to 40% of an acid in water. In accordance with the present disclosure, the acid is least one selected from the group consisting of sulfuric acid, hydrochloric acid and nitric acid. The precipitated silica is separated to obtain silica cake. Typically, the precipitated silica is separated by filtration or decantation.

The silica cake is treated with an acidic aqueous solution of an aluminum salt to obtain a first slurry, followed by stirring the first slurry to obtain a hydrated silica alumina slurry having a pH less than 2. The aluminum salt is at least one of aluminum sulfate and aluminum chloride. Typically, the acidic aqueous solution of the aluminum salt is obtained by mixing the aluminum salt in 30% to 40% of the acid (i.e., 30% to 40% of the acid in water).

An aqueous solution of sodium aluminate or calcium aluminate is added to the hydrated silica alumina slurry to obtain a second slurry, followed by filtering the second slurry to obtain a wet cake. The pH of the second slurry is in the range of 4 to 5. Although sodium aluminate has been used as the base for increasing the pH in the following experiments, calcium aluminate can also be easily substituted as will be well known for a person of ordinary skilled in the art.

Particularly, the wet cake obtained is not pumpable for preparing spray dried spherical particles. Therefore, the wet cake is re-slurried in water to obtain a pumpable slurry, followed by spray drying the pumpable slurry to obtain an amorphous silica-alumina support having an average particle size in the range of 80 μm to 150 μm. In an embodiment of the present disclosure, the pumpable slurry is spray dried by co-current drying. In accordance with an embodiment of the present disclosure, the average particle size of the support is 90 μm.

The support is impregnated with $K_2CO_3$ to obtain a $K_2CO_3$ impregnated support, followed by drying the $K_2CO_3$ impregnated support to obtain a hydrothermally stable catalyst composition. In accordance with the present disclosure, $K_2CO_3$ is impregnated on the support by an incipient wetness impregnation method or a multi-step impregnation method.

Typically, in the incipient wetness impregnation method, $K_2CO_3$ is dissolved in an aqueous or organic solution. Then the solution is added to the support preferably containing the same pore volume as the volume of the solution that was added. The solution is absorbed into the pores by capillary action. If the solution is added in excess of the support pore volume, then the solution transport changes from a capillary action process to a diffusion process, which is a slower process. The catalyst is dried and calcined to remove the volatile components present in the solution, thereby depositing $K_2CO_3$ on the surface of the support. Particularly, the mass transfer conditions are responsible for the concentration profile of $K_2CO_3$ within the pores during the process steps of impregnation and drying.

The catalyst composition is used for low temperature gasification of carbonaceous feedstock using a single fluidized bed gasification system or a dual fluidized bed gasification system, which operates at a temperature in the range of 600° C. to 850° C., at a pressure in the range of 1 bar to 5 bar and in the presence of a gasifying agent (for example: —$CO_2$ or steam), to produce synthesis gas. Moreover, the catalyst composition is stable when subjected to the gasification of carbonaceous feedstocks at a temperature of up to 800° C. for at least 24 hours in the presence of steam. The carbonaceous feedstock is at least one selected from the group consisting of petcoke, coal, biomass, wood and other carbon-containing materials.

Particularly, the catalyst with carbon particles deposited thereon (deactivated catalyst) from the gasifier is fed to a combustor for combusting a portion of the feed in the presence of air at a temperature in the range of 800° C. to 825° C. Due to the combustion, the deposited carbon particles are combusted to regenerate the catalyst. The regenerated catalyst (activated catalyst) is re-circulated in the gasifier. Since, the catalyst undergoes continuous deactivation and activation, it is necessary for the catalyst to have the hydrothermal stability at 850° C. for 24 hours in the presence of steam.

The catalyst composition possesses features such as hydrothermal stability, attrition resistance, high pore volume and surface for better dispersion of $K_2CO_3$ (i.e., high surface area), and consistent activity for the gasification of carbonaceous feedstock.

Further, $K_2CO_3$ does not form agglomerates with the silica-alumina matrix. The catalyst composition of the present disclosure is capable of retaining its pore volume and surface area during the gasification of carbonaceous feedstocks. The loss in pore volume and surface area is within 60% of the original pore volume and surface area prior to the hydrothermal deactivation, and it retains its mechanical strength, i.e., the attrition index in the range of 2% to 8%.

The present disclosure is further described in light of the following laboratory scale experiments which are set forth for illustration purpose only and not to be construed for limiting the scope of the disclosure. These laboratory scale experiments can be scaled up to industrial/commercial scale and the results obtained can be extrapolated to industrial/commercial scale.

EXPERIMENTAL DETAILS

Experiment 1: Preparation of an Amorphous Silica-Alumina Support 745 g of sodium silicate was dissolved in 9000 ml water to obtain an alkaline aqueous solution of sodium silicate. 550 ml of 35% $H_2SO_4$ solution was added to the alkaline aqueous solution of sodium silicate, while maintaining pH of 9 to obtain precipitated silica. The precipitated silica was separated by filtration to obtain silica cake. An acidic aqueous solution of aluminum sulfate was prepared by mixing 354 g of aluminum sulfate in 1062 ml of water.

The so obtained silica cake was added to 1240 ml of acidic aqueous solution of aluminum sulfate to obtain a first slurry. The first slurry was thoroughly stirred to obtain a hydrated silica-alumina slurry having a pH of 1. An aqueous solution of sodium aluminate was added in the hydrated silica-alumina slurry to obtain a second slurry having a pH of 5. The aqueous solution of sodium aluminate was obtained by mixing 290 g of sodium aluminate in 4000 ml of water. The second slurry was filtered on a rotary drum vacuum filter to obtain a wet cake. The wet cake was re-slurried with water to obtain a pumpable slurry. The pumpable slurry was spray dried by co-current drying to obtain a silica-alumina support.

The relative proportions of silica and alumina in the final product were varied by taking different proportions of sodium silicate, aluminum sulfate and sodium aluminate. Different amorphous silica-alumina samples were prepared in which the silica to alumina ratio (SAR) was varied and further these samples were subjected to a hydrothermal deactivation (steaming) test which was carried out in a fluidized reactor at a temperature of 800° C. for 24 hours under continuous steam purging condition. The mechanical strength (which is represented by attrition index) of the support was tested on an attrition testing unit as per ASTM D5757 method for obtaining respective attrition index.

Table-1a summarizes the physical properties of different amorphous silica-alumina supports prepared in accordance with the embodiments of the present disclosure, both fresh (as such) and after hydrothermal deactivation and Table-1 b summarizes the physical properties of different γ-alumina based supports of the conventional catalysts.

TABLE 1a

Characterization of different amorphous silica-alumina (SAR = $SiO_2$: $Al_2O_3$) based supports of the present disclosure

| S. No. | Support | Catalyst condition | TSA ($m^2/g$) | TPV (cc/g) | Pore diameter (°A) | Attrition index (%) |
|---|---|---|---|---|---|---|
| 1 | SAR = 1:8 | Fresh | 203 | 0.724 | 138 | 4.28 |
| 2 | (0.12) | Steamed | 177 | 0.612 | 143 | 5.7 |
| 3 | SAR = 1:3.7 | Fresh | 210 | 0.74 | 142 | 2.75 |
| 4 | (0.27) | Steamed | 182 | 0.65 | 147 | 3.81 |
| 5 | SAR = 1:4.8 | Fresh | 225 | 0.775 | 138 | 2.38 |
| 6 | (0.20) | Steamed | 192 | 0.695 | 143 | 3.12 |
| 7 | SAR = 1:3.5 | Fresh | 219 | 0.688 | 125 | 2.14 |
| 8 | (0.28) | Steamed | 178 | 0.576 | 130 | 3.32 |
| 9 | SAR = 1:2 | Fresh | 240 | 0.82 | 136 | 2.12 |
| 10 | (0.5) | Steamed | 203 | 0.76 | 141 | 2.95 |
| 11 | SAR = 1:1.4 | Fresh | 247 | 0.815 | 132 | 5.64 |
| 12 | (0.7) | Steamed | 211 | 0.742 | 138 | 6.21 |

(TSA-total surface area, TPV-total pore volume)

From Table-1a, it is evident that there is a minor reduction in the pore volume and surface area, and minor increase in the attrition index after the hydrothermal deactivation as compared to that of the fresh catalyst support. From Table-1a, it is also evident that at $SiO_2$:$Al_2O_3$(SAR) of 0.5, the support possesses comparatively higher pore volume (0.82 cc/g), surface area (240 $m^2/g$) and mechanical strength (attrition index <2.2).

TABLE 1b

Characterization of different γ-alumina based supports of the conventional catalysts

| S. No. | Support | Catalyst condition | TSA ($m^2/g$) | TPV (cc/g) | Pore diameter (°A) | Attrition index (%) |
|---|---|---|---|---|---|---|
| 1 | γ-Alumina | Fresh | 184 | 0.459 | 99 | 3.4 |
| 2 | | Steamed | 65 | 0.279 | 171 | 4.2 |
| 3 | 3% Ce on | Fresh | 196 | 0.464 | 95 | 3.8 |
| 4 | γ-Alumina | Steamed | 124 | 0.435 | 140 | 4.5 |
| 5 | 5% Ce on | Fresh | 144 | 0.449 | 124 | 4.1 |
| 6 | γ-Alumina | Steamed | 86 | 0.333 | 160 | 4.5 |

TABLE 1b-continued

Characterization of different γ-alumina based supports of the conventional catalysts

| S. No. | Support | Catalyst condition | TSA (m²/g) | TPV (cc/g) | Pore diameter (°A) | Attrition index (%) |
|---|---|---|---|---|---|---|
| 7 | 3% alumina on | Fresh | 130 | 0.407 | 125 | 3.6 |
| 8 | γ-Alumina | Steamed | 81 | 0.323 | 158 | 3.9 |
| 9 | 5% alumina on | Fresh | 226 | 0.277 | 49 | 3.7 |
| 10 | γ-Alumina | Steamed | 117 | 0.269 | 92 | 4.2 |
| 11 | 3% La on | Fresh | 224 | 0.396 | 70 | 5.5 |
| 12 | γ-Alumina | Steamed | 121 | 0.389 | 136 | 6.7 |
| 13 | Modified | Fresh | 231 | 0.432 | 95 | 4.5 |
| 14 | γ-Alumina by high digestion time | Steamed | 122 | 0.417 | 137 | 5.8 |

From Table-1 b, it is clear that there is no significant improvement in the surface area, pore volume and attrition index of a catalyst composition obtained by impregnating varying amounts of different metals such as La and Ce on γ-Alumina as compared to the conventional catalyst (γ-Alumina).

From Table-1a and Table-1b, it is evident that the surface area, pore volume and attrition index of the catalyst composition of the present disclosure is better as compared to that of the conventional γ-alumina support and conventional catalyst composition (as shown in Table-1 b).

The properties such as the surface area, pore volume and attrition index are responsible for increasing the hydrothermal stability of a catalyst composition. From Table-1a and Table-1b, it is evident that these properties are better in case of the catalyst composition of the present disclosure as compared to that of the conventional γ-alumina support and conventional catalyst composition; therefore, it can be concluded that the hydrothermal stability of the catalyst composition of the present disclosure is superior as compared to of the conventional γ-alumina support.

Experiment 2a: Impregnation of $K_2CO_3$ on the Silica-Alumina Support Using Wet-Impregnation Method The alkali metal supported catalyst was prepared by impregnating $K_2CO_3$ on the support, i.e., amorphous silica-alumina support (having SAR of 0.5) by using the incipient wetness impregnation method. In this method, 100 g of $K_2CO_3$ was dissolved in 90 ml water to obtain a saturated solution of $K_2CO_3$. 100 g of amorphous silica-alumina was poured into the $K_2CO_3$ saturated solution and was mixed thoroughly for 1 hour to obtain the mixture. The so obtained mixture was dried at 80° C. for 24 hours. The mixture was further dried under reduced pressure at 105° C. for 12 hours to obtain the hydrothermally stable supported catalyst composition.

Experiment 2b: Impregnation of $K_2CO_3$ on the Silica-Alumina Support Using Multi-step Impregnation Method In multi-step impregnation method, an active metal is impregnated on the support in a stage wise manner in which a fraction of the total amount of the active metal is impregnated at each stage.

In this method, 10 wt % of $K_2CO_3$ was impregnated at every successive stage and the catalyst was dried in each impregnation stage.

Different amounts of $K_2CO_3$ impregnated on the support are illustrated in Table-2a.

TABLE 2a

Ratio of $K_2CO_3$ to support in accordance with the present disclosure

| $K_2CO_3$ (%) | Support (%) | Alkali (K) (56.58% of $K_2CO_3$) | Alkali (K)/Support Ratio |
|---|---|---|---|
| 5 | 95 | 2.83 | 0.03 |
| 10 | 90 | 5.66 | 0.06 |
| 20 | 80 | 11.32 | 0.14 |
| 30 | 70 | 16.98 | 0.24 |
| 40 | 60 | 22.63 | 0.38 |
| 50 | 50 | 28.29 | 0.57 |
| 60 | 40 | 33.95 | 0.85 |

Table-2b summarizes the properties of $K_2CO_3$ supported on the amorphous silica-alumina support (having SAR of 0.5) prepared by impregnating 10 wt % to 60 wt % of $K_2CO_3$ on the silica-alumina support using the single step and multi-step impregnation methods of the present disclosure.

TABLE 2b

Comparison of the characteristics of $K_2CO_3$ supported on the amorphous silica-alumina support prepared using the single step and multi-step impregnation methods of the present disclosure

| S. No. | Preparation method | No. of equal steps | $K_2CO_3$ impregnated on the support i.e. amorphous silica:alumina (SAR = 0.5) | TSA (m²/g) | TPV (cc/g) | Pore diameter (°A) |
|---|---|---|---|---|---|---|
| 1 | | | Support (SAR = 0.5) alone | 240 | 0.82 | 136 |
| 2 | Single step impregnation | 1 | 10 wt % $K_2CO_3$ | 220 | 0.74 | 140 |
| 3 | | 1 | 20 wt % $K_2CO_3$ | 189 | 0.62 | 143 |
| 4 | | 1 | 30 wt % $K_2CO_3$ | 160 | 0.49 | 147 |
| 5 | | 1 | 40 wt % $K_2CO_3$ | 125 | 0.36 | 145 |
| 6 | | 1 | 50 wt % $K_2CO_3$ | 95 | 0.24 | 149 |
| 7 | | 1 | 60 wt % $K_2CO_3$ | 48 | 0.12 | 152 |
| 8 | Multi step impregnation | 2 | 20 wt % $K_2CO_3$ | 196 | 0.85 | 143 |
| 9 | | 3 | 30 wt % $K_2CO_3$ | 173 | 0.55 | 151 |
| 10 | | 4 | 40 wt % $K_2CO_3$ | 145 | 0.44 | 138 |
| 11 | | 5 | 50 wt % $K_2CO_3$ | 118 | 0.34 | 140 |
| 12 | | 6 | 60 wt % $K_2CO_3$ | 95 | 0.26 | 144 |
| 13 | | 2 | 40 wt % $K_2CO_3$ | 134 | 0.39 | 140 |
| 14 | | 3 | 60 wt % $K_2CO_3$ | 80 | 0.21 | 142 |

From Table-2b, it is observed that the pore volume and the surface area decrease with increase in the loading of $K_2CO_3$. However, for a given loading of $K_2CO_3$, the surface area and pore volume are higher in case of the multi-step impregnation method as compared to that of the single step impregnation method. In case of multi-step impregnation, the active component ($K_2CO_3$) covers the pore walls and is filled in the pores of the support, thereby resulting in less decrease in the pore volume and surface area as compared to that of the single step impregnation method. This multi-step impregnation is expected to provide better metal dispersion throughout the support due to the controlled loading of active metal in step-wise manner. Moreover, the interaction of $K_2CO_3$ and the support does not result in a significant change in the mesoporous structure of the support.

Experiment 3: Gasification Activity

The gasification activity of the hydrothermally stable silica-alumina supported catalyst of the present disclosure (i.e. $K_2CO_3$ supported on the amorphous silica-alumina support [wherein SAR=0.5]) was verified by carrying out the steam gasification of petcoke (1 g) at a temperature of 700° C. with a catalyst to coke ratio of 50, for a time period of 10 minutes in a fixed fluid bed reactor. The catalytic steam gasification activity of the petcoke was verified by using a laboratory-scale fixed fluid bed reactor set-up consisting of a vertical tubular reactor (30 cm length and 4 cm width) and a steam generator, which was heated with the help of an electric split furnace. Studies were conducted under catalytic conditions in which the reactor was loaded with a mixture of 1 g of petcoke and 50 g of the hydrothermally stable silica-alumina supported catalyst prepared in Experiment 1.

The loaded reactor was then kept in the split furnace and heated up to the reaction temperature of 700° C. under nitrogen gas (inert gas) flow. Once the desired reaction temperature of 700° C. was attained, nitrogen supply to the reactor was replaced with steam at a flow rate of 0.3 g/min. The pressure was maintained at 1 bar in the presence of steam as a gasifying agent, the fluidized bed superficial velocity was maintained at 0.5 m/s, the catalyst to feed ratio was 50 and the molar ratio of gasifying agent to the carbonaceous feedstock was 2. The total product gas was collected in a water displacement system and further analyzed with the help of gas chromatography (GC). The amount of the gas produced depends on the reaction rate/carbon conversion, which is dependent on the catalyst effectiveness at a given operating condition. The steam supply of the reactor was stopped after 15 minutes. The un-reacted petcoke was burnt with air and the total combustion product gas was also collected and its composition was measured. Further, the carbon content in the combustion product gas (in terms of $CO_2$ and CO gases) was calculated to estimate the remaining carbon which did not react during the steam gasification of petcoke. Further, the complete mass balance and precise carbon conversion of steam gasification was verified from the composition analysis of the product gases of both gasification and combustion reactions.

Table-3a summarizes the gasification activity of the hydrothermally stable silica-alumina catalyst compositions of the present disclosure. Particularly, Table-4a provides a comparative analysis of the gasification activity when 50 wt % of $K_2CO_3$ was impregnated on the amorphous silica-alumina support (SAR=0.5) prepared by the single impregnation step method and 60 wt % of $K_2CO_3$ was impregnated on the amorphous silica-alumina support (SAR=0.5) prepared by the multi-step impregnation method.

Table-3b provides a comparison between the gasification activity of the conventional fresh catalyst, i.e., 50% $K_2CO_3$ on γ-alumina and the hydrothermally deactivated conventional catalyst.

TABLE 3b

Comparison of the gasification activity of the conventional alkali supported catalyst (γ-Alumina) under different conditions fresh and steamed (hydrothermal deactivation)

| Supported catalyst | Catalyst condition | Reaction time (minutes) | Temperature (° C.) | Catalyst/coke (g/g) | Carbon conversion (%) |
|---|---|---|---|---|---|
| 50% $K_2CO_3$ on γ-Alumina | Fresh Steamed | 15 | 700 | 50 | 85.6 45 |

From Table-3b, it is clear that upon deactivation of the conventional supported catalyst (γ-alumina) a significant loss in gasification activity is observed because of the low surface area and pore volume of the catalyst after the hydrothermal deactivation i.e. γ-alumina support loses its pore volume and surface area. From Tables-3a and 3b, it can be concluded that the gasification activity of the fresh and steamed catalyst composition of the present disclosure is significantly higher as compared to that of the conventional alkali supported catalyst (γ-Alumina).

Experiment 4: Re-Usability of the Hydrothermally Stable Catalyst

The re-suability of the hydrothermally stable catalyst of the present disclosure (i.e., alkali supported on the amorphous silica-alumina support [SAR=0.5]) was verified by carrying out the steam gasification of petcoke (1 g) at a temperature of 700° C. with a catalyst to coke ratio of 50, for 10 minutes in a fixed fluid bed reactor, similar to the process described in Experiment-3. The hydrothermally stable catalyst was prepared by impregnating the 50% of $K_2CO_3$ on the TABLE 3a Comparison of the gasification activity and the properties of the catalyst composition of the present disclosure, i.e., $K_2CO_3$ supported on the amorphous silica-alumina support before and after hydrothermal deactivation

| Metal loading | Impregnation technique | Support | Catalyst condition | Surface area ($m^2/g$) | Pore volume (cc/g) | Attrition index (%) | Reaction time & temperature | Carbon conversion (%) |
|---|---|---|---|---|---|---|---|---|
| 60 wt % of $K_2CO_3$ | Multi-step Impregnation | Amorphous silica:alumina (SAR = 0.5) | Fresh Steamed | 95 48 | 0.26 0.14 | 3.6 4.2 | 10 min & 700° C. | 100 92 |
| 50 wt % of $K_2CO_3$ | Single-step Impregnation | | Fresh Steamed | 95 40 | 0.24 0.11 | 3.42 4.1 | 10 min & 700° C. | 100 85 |

From Table-3a, it is evident that the silica-alumina supported catalyst of the present disclosure is capable of retaining its activity even after the hydrothermal deactivation. Hence, the supported catalyst of the present disclosure has improved properties such as hydrothermal stability, attrition resistance, high pore volume/surface area, and the catalyst is capable of sustaining the gasification activity at low temperature (700° C.) even after hydrothermal deactivation as compared to that of the conventional $K_2CO_3$ supported γ-alumina catalyst.

amorphous silica-alumina support (SAR=0.5) by using the multi-step impregnation method as explained in Experiment-2. Further, the catalyst was hydrothermally deactivated prior to its use in this experiment. After the completion of each reaction, the used catalyst was collected and re-used for the next reaction and this was repeated 5 times. The results of re-usability are tabulated in Table-4.

Table-4 summarizes the gasification activity of the five reactions which were carried out under similar conditions in the presence the same catalyst (re-used catalyst).

TABLE 4

Re-usability of the hydrothermally deactivated catalyst, i.e., 50 wt % of $K_2CO_3$ supported on the amorphous silica-alumina support (SAR = 0.5)

| | 1st Usage | 2nd Usage | 3rd Usage | 4th Usage | 5th Usage |
|---|---|---|---|---|---|
| Carbon Conversion (%) | 89 | 87 | 88 | 87 | 89 |

From Table-4, it is evident that the catalyst of the present disclosure is capable of sustaining the gasification activity, i.e., the gasification activity is consistent, during the steam gasification of petcoke at a temperature of 700° C., and can be re-used.

From the above experiments, it can be concluded that the gasification activity of the catalyst composition of the present disclosure is high and it exhibits regenerability, i.e., it is capable of retaining its activity without any decay, as compared to that of the conventional catalyst. It can also be concluded that the catalyst composition does not lose its properties such as pore volume, surface area and attrition resistance even after hydrothermal deactivation, thereby enabling higher loading of $K_2CO_3$ on the amorphous silica-alumina support.

Technical Advances and Economical Significance

The present disclosure described herein above has several technical advantages including, but not limited to, the realization of a hydrothermally stable catalyst composition that:

possess properties such as high hydrothermal stability, pore volume, surface area, and mechanical strength; and is capable of retaining the gasification activity even after hydrothermal deactivation, at significantly lower temperature.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A hydrothermally stable catalyst composition for low temperature gasification of carbonaceous feedstock, said catalyst composition comprising:
    a) an amorphous silica-alumina support;
        wherein said amorphous silica-alumina support having an average particle size in the range of 80 μm to 150 μm;
        wherein a weight ratio of silica to alumina in said amorphous silica-alumina support is in the range of 0.1 to 1.5; and
    b) $K_2CO_3$ impregnated on said amorphous silica-alumina support;
        wherein said $K_2CO_3$ is impregnated on said amorphous silica-alumina support in an amount in the range of 5 wt % to 60 wt % with respect to the total catalyst composition.

2. The catalyst composition as claimed in claim 1 is characterized by a pore volume in the range of 0.1 cc/g to 0.9 cc/g, a surface area in the range of 40 $m^2$/g to 250 $m^2$/g, pore diameter in the range of 125 to 150 Å and an attrition index in the range of 2% to 8% as measured per ASTM D5757.

3. The catalyst composition as claimed in claim 1, is stable during the hydrothermal deactivation at a temperature in the range of 750 to 850 deg C. in presence of steam environment and loss of pore volume is within 15% and loss of surface area is within 20% and change in pore diameter by 4% and attrition index is within 10%.

4. The catalyst composition as claimed in claim 1, wherein a weight ratio of silica to alumina in said amorphous silica-alumina support is in the range of 0.1 to 0.9.

5. The catalyst composition as claimed in claim 2, wherein said pore volume, said surface area, pore diameter and said attrition index of said catalyst composition is retained after gasification of the carbonaceous feedstock at a temperature up to 850 deg C.

6. A process for preparing the hydrothermally stable catalyst composition of claim 1, said process comprising the following steps:
    a) mixing a silica salt in water to obtain an alkaline aqueous solution;
    b) adding an acidic aqueous solution comprising 30% to 40% of an acid in water to said alkaline aqueous solution while maintaining the pH in the range of 8 to 9, to obtain precipitated silica;
    c) separating said precipitated silica to obtain silica cake;
    d) treating said silica cake with an acidic aqueous solution of an aluminum salt to obtain a first slurry;
    e) stirring said first slurry to obtain a hydrated silica alumina slurry having a pH less than 2;
    f) adding an aqueous solution of sodium aluminate or calcium aluminate to said hydrated silica alumina slurry to obtain a second slurry having a pH in the range of 4 to 5;
    g) filtering said second slurry to obtain a wet cake;
    h) re-slurring said wet cake in water to obtain a pumpable slurry, followed by spray drying said pumpable slurry to obtain an amorphous silica-alumina support having an average particle size in the range of 80 μm to 150 μm; and
    i) impregnating said support with $K_2CO_3$ to obtain a $K_2CO_3$ impregnated support, followed by drying said $K_2CO_3$ impregnated support to obtain a hydrothermally stable catalyst composition.

7. The process as claimed in claim 6, wherein said silica salt is at least one of sodium silicate and potassium silicate.

8. The process as claimed in claim 6, wherein said acid is least one selected from the group consisting of sulfuric acid, hydrochloric acid and nitric acid.

9. The process as claimed in claim 6, wherein said aluminum salt is at least one of aluminum sulfate and aluminum chloride.

10. The process as claimed in any one of the claim 6, wherein said acidic aqueous solution of said aluminum salt of the process step d) is obtained by mixing said aluminum salt in 30% to 40% of an acid.

11. The process as claimed in claim 6, wherein $K_2CO_3$ is impregnated on said support by either an incipient wetness impregnation method or a multi-step impregnation method.

\* \* \* \* \*